3 Sheets--Sheet 1.

S. R. NYE.
Horse-Rake.

No. 6,679. Reissued Oct. 5, 1875.

Witnesses
A. L. Denison
Sam'l M. Barton.

S. R. Nye
A. B. Barnard
assignees of
S. R. Nye Inventor
by their Attys.
C. D. Wright & Brown

N. PETERS, PHOTO-LITHOGRAPHER, WASHINGTON, D. C.

S. R. NYE.
Horse-Rake.

No. 6,679. Reissued Oct. 5, 1875.

Witnesses.
A. E. Denison
Samᵗ M. Barton.

S. R. Nye
A. B. Barnard.
assignees of
S. R. Nye. Inventor.
by their Attys.
C. D. Wright & Brown.

N. PETERS, PHOTO-LITHOGRAPHER, WASHINGTON, D. C.

S. R. NYE.
Horse-Rake.

No. 6,679.

Reissued Oct. 5, 1875.

Witnesses.
A. E. Denison
Sam'l M. Barton

S. R. Nye
A. B. Barnard.
assignees of
S. R. Nye. Inventor.
by their Attys.
C. S. Wright & Brown

N. PETERS, PHOTO-LITHOGRAPHER, WASHINGTON, D. C.

UNITED STATES PATENT OFFICE

SHERMAN R. NYE, OF WINCHENDON, MASSACHUSETTS, ASSIGNOR TO HIMSELF AND ANDREW B. BARNARD, OF SAME PLACE.

IMPROVEMENT IN HORSE-RAKES.

Specification forming part of Letters Patent No. 85,757, dated January 12, 1869; reissue No. 6,679, dated October 5, 1875; application filed August 2, 1875.

*To all whom it may concern:*

Figure 1:
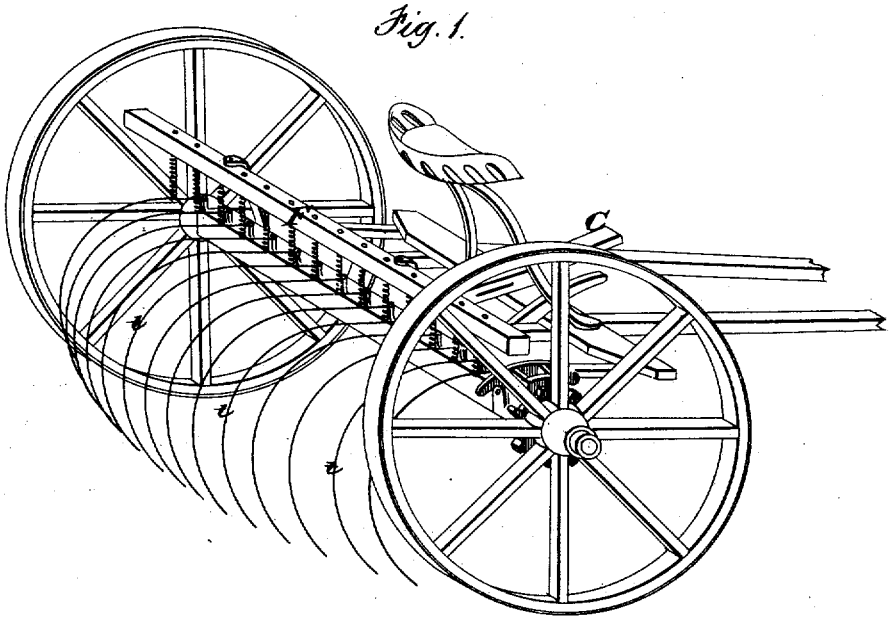
Figure 4:
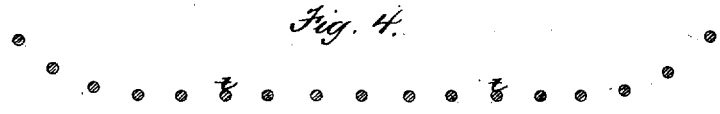
Figure 5:
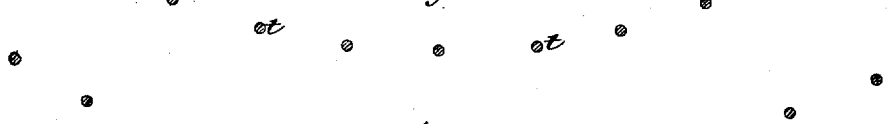
Figure 6:
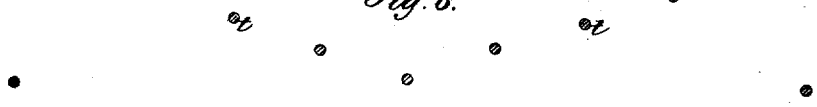
Figure 7:
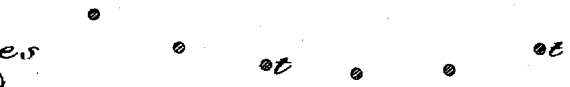
Figure 2:
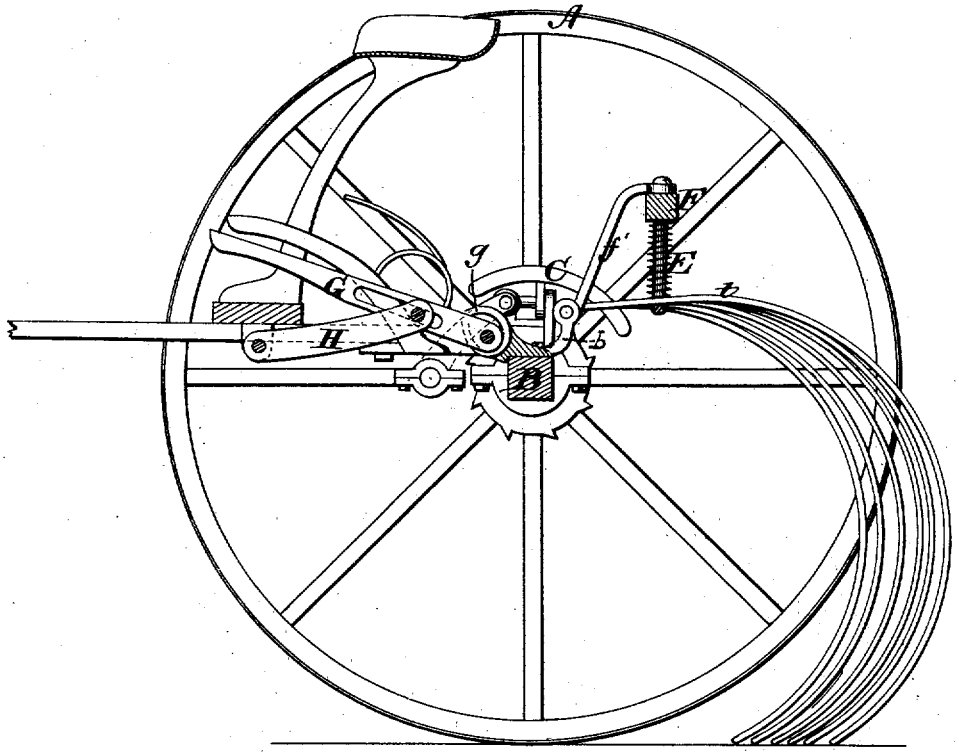
Figure 3:
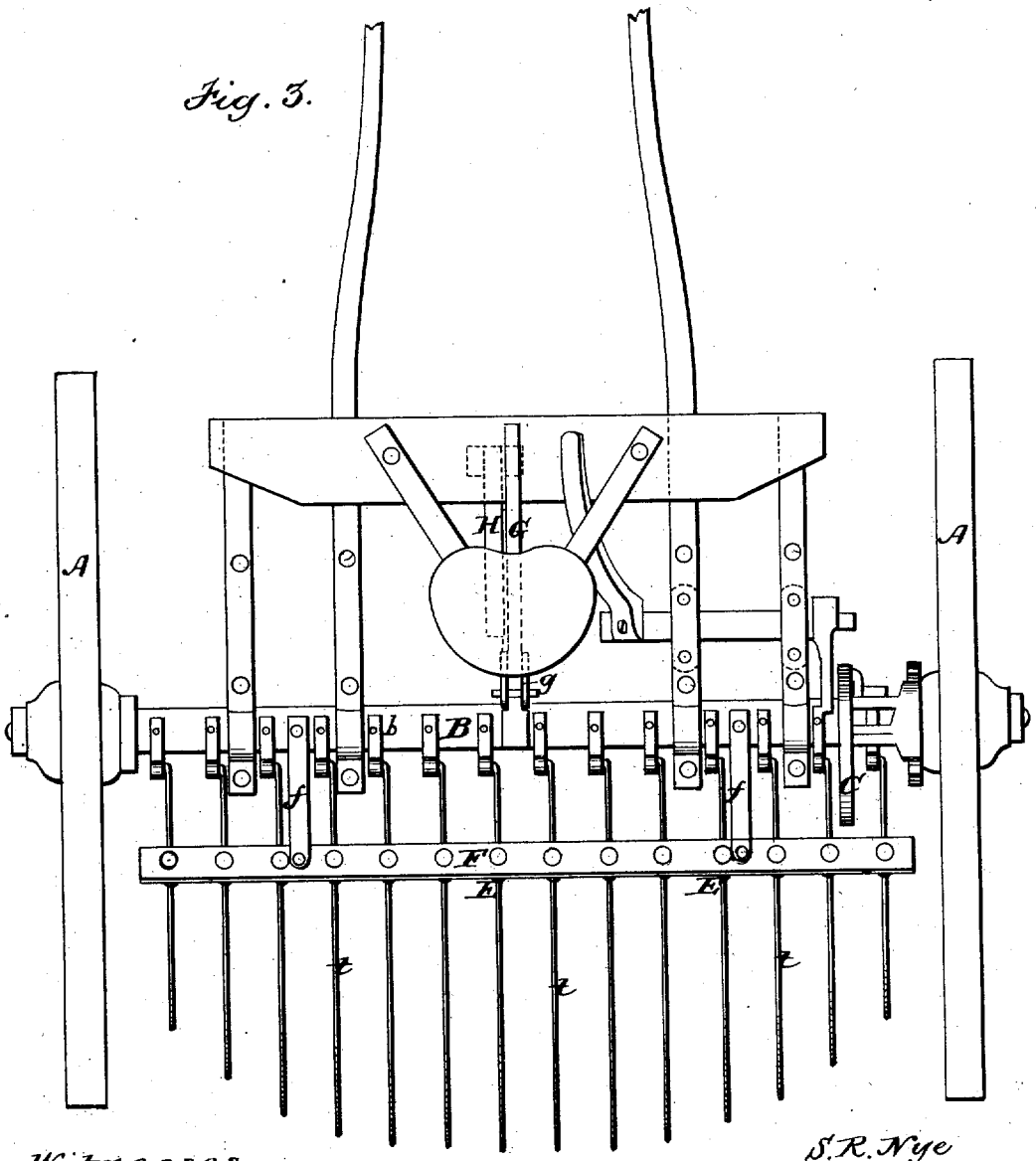

Be it known that SHERMAN R. NYE, of Winchendon, in the county of Worcester and State of Massachusetts, has invented certain Improvements in Horse Hay-Rakes, of which the following is a specification:

In the accompanying drawings, forming a part of this specification, Figure 1 represents a perspective view of a rake embodying these improvements. Fig. 2 represents a vertical longitudinal section. Fig. 3 represents a plan view; and Figs. 4, 5, 6, and 7 represent different modes of arranging the teeth of the rake.

Similar letters of reference in the drawings refer to like parts.

The object of this invention is to so construct and arrange the teeth of horse or hand rakes as to enable them, in gathering the hay, to prevent it from passing off from the ends of the machine, and also to provide a ready means for securely holding the teeth upon the ground while the machine is in operation. To these ends the invention consists, first, in so constructing and arranging the teeth of a hay-rake that they shall present a concave or dished front, which tends to prevent the hay from passing off at the ends of the rake and pressing against the wheels. It consists, secondly, in a peculiar arrangement for holding the axle-tree, to which the teeth are attached, from turning, so as to cause the latter to bear upon the ground during the operation of raking.

In general construction and operation the rake to which the present improvements are applied is similar to that for which a patent was granted to him on March 13, 1866. As in said patent, the rake is elevated by power derived directly from the wheel by means of a dog mounted on the axle near the hub of one of the wheels, in connection with a toothed wheel or plate secured to the hub of one of the wheels. The dog is thrown into gear with the toothed wheel or plate by means of an arm carrying a friction-wheel, the said arm being connected to a foot-lever near the driver's seat.

In the drawings, A A′ represent the wheels, attached to the axle or shaft B. Upon the shaft B is secured a series of short arms, *b*, to which are hinged or pivoted the teeth *t*. C is a dog or clutch, arranged upon the axle B near the hub of one of the wheels, and provided with stops or teeth, which may be thrown into gear with a toothed wheel or plate secured to the hub of the wheel, so that as the wheel rotates, when the clutch or dog is thrown into gear with the same, the teeth of the rake will be elevated. The clutch is operated by means of a rock-shaft, to which is attached a lever under control of the driver's foot. The teeth are prevented from any lateral movement by means of staples, through which they pass, the said staples being attached to a transverse bar secured to braces *f*, which are attached to the main axle, and the teeth are held down by means of coiled springs bearing upon each of the teeth, so that any one of the same is allowed to rise to pass over any obstruction.

In the machine above referred to which was patented to him, and in all other hay-rakes with which we are acquainted, the teeth in each machine are made of uniform length, and of the same curvature respectively, the teeth being in a straight line across the rake, and in consequence of this arrangement the hay, as it is gathered or accumulated by the rake-teeth, is liable to spread out and escape at the ends of the machine.

I obviate this difficulty by giving the toothed portion of the rake a concave or dished front, that tends to counteract the tendency of the hay to spread outward, and, to a greater or less degree, concentrate it at the center of the rake. This concave or dished front I prefer to form by giving the rake-teeth *t* different lengths and different degrees of curvature, those at or near the center of the rake being made longer, and curved backwardly farther than those at the ends, as shown in the drawings.

It will be readily seen that this arrangement prevents the hay accumulated by the rake-teeth from becoming detached in masses at the ends of the rake and being left behind. On the other hand, the motion of the rake tends to gather the hay toward the central or rear portion of the concave or dished front presented by the rake-teeth; hence the hay is prevented from passing away from the ends of the rake and pressing against the wheels, and a full raking can be made at each passage of the rake across the field, there being no necessity of the rake-teeth lapping over on the previously-raked ground to any material extent.

By this arrangement of teeth the separation of the hay to be gathered into a windrow from that remaining unraked is rendered much more perfect than by the usual construction, and the edges of the hay remaining unraked are left more regular. The work can therefore be done more quickly and perfectly than with rakes of the ordinary construction.

Figs. 4, 5, 6, and 7 are horizontal sections taken through the accumulating portion of the rake, showing different modifications of the concave or dished arrangement described. The accumulating portion of the rake includes all portions of the teeth against which the hay presses as it is gathered by the points of the teeth, the main accumulation rising above the points. This part of my invention is applicable to horse or hand rakes.

To the central portion, or nearly so, of the axle B is attached a support, *g*, formed with an opening or openings through which passes a pin or bolt, which constitutes the pivot of the rear end of a lever, G. Through the central portion of the lever G passes a bolt or pin, which pivots said lever to an arm, H, the latter being pivoted at its opposite end to the frame-work of the rake forward of the axle. The parts G and H form a compound lever, the part G being so arranged as to be easily depressed by the foot of the driver, by which operation a very great pressure can be easily exerted upon the axle B, in such manner as to press the teeth upon the ground.

We claim as the invention of SHERMAN R. NYE—

1. A hay-rake having its teeth arranged so as to present a concave or dished front at the part where the hay is accumulated in raking, substantially as and for the purpose specified.

2. The compound lever G H, attached to the support *g* on the rake-axle, and to the frame-work of the rake in front of the axle, substantially as and for the purpose specified.

SHERMAN R. NYE.
ANDREW B. BARNARD.

Witnesses:
C. F. BROWN,
SAML. M. BARTON.